United States Patent [19]

DeSimone et al.

[11] Patent Number: 5,539,860
[45] Date of Patent: *Jul. 23, 1996

[54] SPEECH RECOGNITION USING BIO-SIGNALS

[75] Inventors: Joseph DeSimone, Bradley Beach; Jian-Tu Hsieh, Holmdel, both of N.J.

[73] Assignee: AT&T Corp., Murray Hill, N.J.

[ * ] Notice: The term of this patent shall not extend beyond the expiration date of Pat. No. 5,539,861.

[21] Appl. No.: 171,584

[22] Filed: Dec. 22, 1993

[51] Int. Cl.$^6$ ............................................. G10L 5/06
[52] U.S. Cl. .................... 395/2.43; 395/2.52; 395/2.4
[58] Field of Search ............................ 395/2.16, 2.4, 395/2.43, 2.45, 2.46, 2.48, 2.50, 2.52

[56] References Cited

U.S. PATENT DOCUMENTS

| | | | |
|---|---|---|---|
| 4,139,732 | 2/1979 | Fourcin | 395/2.85 |
| 4,256,924 | 3/1981 | Sakoe | 179/1 SD |
| 4,390,756 | 6/1983 | Hoffmann et al. | 179/107 |
| 4,611,596 | 9/1986 | Wasserman | 128/419 |
| 4,718,096 | 1/1988 | Meisel | 381/43 |
| 4,894,777 | 1/1990 | Negishi et al. | 364/419 |
| 4,901,354 | 2/1990 | Gollmar et al. | 381/10 |
| 5,092,343 | 3/1992 | Spitzer et al. | 128/733 |
| 5,171,930 | 12/1992 | Teaney | 84/725 |

FOREIGN PATENT DOCUMENTS

| | | |
|---|---|---|
| 0504485 | 9/1992 | European Pat. Off. . |
| 0538626 | 4/1993 | European Pat. Off. . |

OTHER PUBLICATIONS

R. Benjamin Knapp, et al "A Real–Time Digital Processing System for Bioletric Control of Music", ICASSP '88, Sep./1988 pp. 2556–2557.
Database WPIL, No. 92–380730, Derwent Publications LTD., London; & TP–A–109204 (Anonymous), Abstract.
European Search Report dated Apr. 3, 1995, regarding EPO Application No. EP 94 308994.6.

Primary Examiner—Allen R. MacDonald
Assistant Examiner—Thomas J. Onka
Attorney, Agent, or Firm—Christopher N. Malvone

[57] ABSTRACT

The recognition rate of a speech recognition system is improved by compensating for changes in the user's speech that result from factors such as emotion, anxiety or fatigue. A speech signal derived from a user's utterance, and a bio-signal, which is indicative of the user's emotional state, are provided to a speech recognition system. The bio-signal is used to provide a reference frequency that changes when the user's emotional state changes. An utterance is identified by examining the relative magnitudes of its frequency components and the position of the frequency components relative to the reference frequency.

13 Claims, 4 Drawing Sheets

SPEECH RECOGNITION USING BIO-SIGNALS

CROSS REFERENCE TO RELATED APPLICATIONS

Related subject matter is disclosed in the applications filed concurrently herewith and assigned to the same assignee hereof entitled "Speech Recognition Training Using Bio-Signals" Ser. No. 08/171,585 and "Speech Recognition Using Bio-Signals" Ser. No. 08/171,586.

TECHNICAL FIELD

The present invention relates to speech recognition; more specifically speech recognition using bio-signals.

DESCRIPTION OF THE PRIOR ART

In the past, speech recognition systems were used to control electronic devices such as computers with verbal commands. FIG. 1 illustrates a speech recognition system and includes a personal computer or PC 10, with a display 12, keyboard 14, and an audio card 16 that is inserted into a card slot within PC 10. Microphone 18 is used to provide verbal inputs to audio card 16. Audio card 16 can be an audio card sold under the trade name (SPEECH COMMANDER) by Verbex Voice Systems, Inc.

In addition to using audio card 16, PC 10 runs software packages sold under the trade names (LISTEN) by Verbex Voice Systems, Inc. and (WINDOWS) by Microsoft Corporation, to provide verbal control of PC 10's actions using speech recognition. These systems are operated by training the system to recognize a word or utterance by speaking the utterance into microphone 18 while the recognition system is in a training mode. Afterwards, the system recognizes utterances that were spoken during the training mode, and executes the commands corresponding to the utterances.

During a normal day's work, a user's voice may vary due to changes in the user's emotional state or due to the user becoming fatigued. These changes in the user's voice characteristics reduce the recognition rate, and result in user frustration, increased computer error and reduced productivity.

SUMMARY OF THE INVENTION

An embodiment of the present invention combines a bio-signal with a speech signal to improve speech recognition. A reference point, which is derived from the bio-signal, is used to analyze an utterance to be recognized. When the frequency components of the utterance move in frequency as a result of the user becoming excited or fatigued, the corresponding change in the bio-signal is used to provide a reference point that also moves in frequency. The moving reference point compensates for the variations in the frequency components of the utterance and thereby increases the recognition rate.

DETAILED DESCRIPTION

Figure 1:
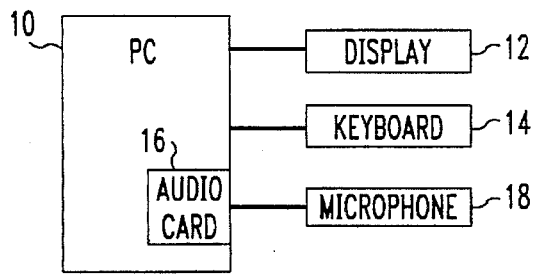
FIG. 1 illustrates a personal computer with an audio card and a microphone.
Figure 2:
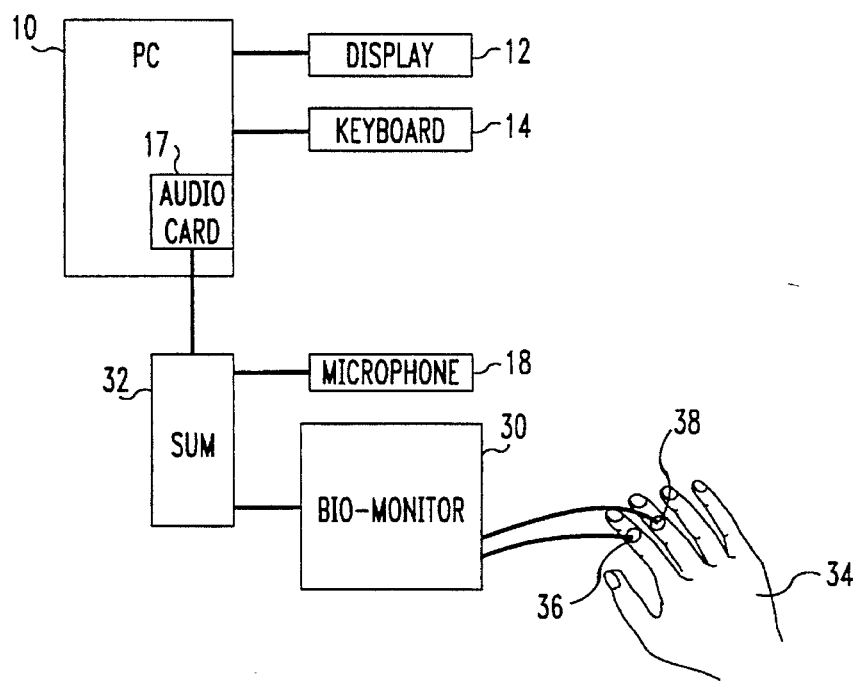
FIG. 2 illustrates a speech recognition system that combines a bio-signal with a speech signal.

FIG. 2 illustrates a system where a speech signal from microphone 18 and a bio-signal from bio-monitor 30 are summed by summer 32 which provides an input to audio card 17. Bio-monitor 30 monitors the impedance between two points on user 34's skin by monitoring the impedance between contacts 36 and 38. FIG. 2 shows the contacts attached to user 34's fingers; however, it is also possible to attach the contacts to other positions on the user's skin. A bio-monitor such as a bio-feedback monitor sold by Radio Shack, which is a division of Tandy Corporation, under the trade name (MICRONTA® BIOFEEDBACK MONITOR) model number 63-664 may be used.

Figure 3:
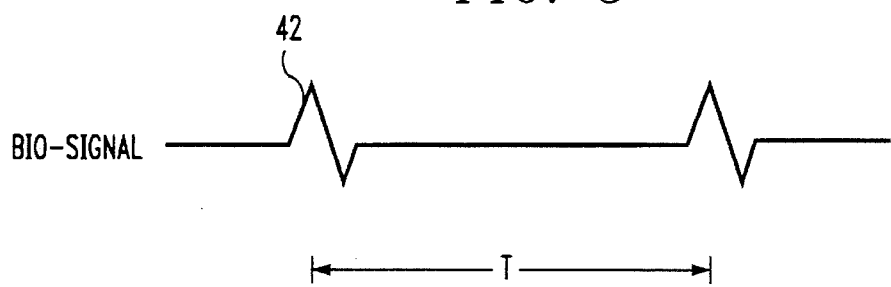
FIG. 3 illustrates a bio-signal produced by a bio-monitor.

When bio-monitor 30 is the above-referenced monitor available from Radio Shack, the bio-signal is in the form of a series of ramp-like signals, where each ramp is approximately 0.2 m sec. in duration. FIG. 3 illustrates a bio-signal, where a series of ramp-like signals 42 are separated by a time T. The amount of time T between ramps 42 relates to the impedance between points 38 and 36. When the user is in a more excited or anxious state, the impedance between points 38 and 36 is decreased, and time T is decreased. When the user is in a less excited state, the impedance between points 38 and 36 is increased, and time T is increased.

The form of a bio-signal from a bio-monitor can be in forms other than a series of ramp-like signals. For example, the bio-signal can be an analog signal that varies in periodicity, amplitude and/or frequency based on measurements made by the bio-monitor, or it can be a digital value based on conditions measured by the bio-monitor.

It is also possible to monitor bio-signals other than a signal indicative of the impedance between two points on a user's skin. Signals indicative of autonomic activity may be used as bio-signals. Signals indicative of autonomic activity such as blood pressure, pulse rate, brain wave or other electrical activity, pupil size, skin temperature, transparency or reflectivity to a particular electromagnetic wavelength or other signals indicative of the user's emotional state may be used.

Figure 4:
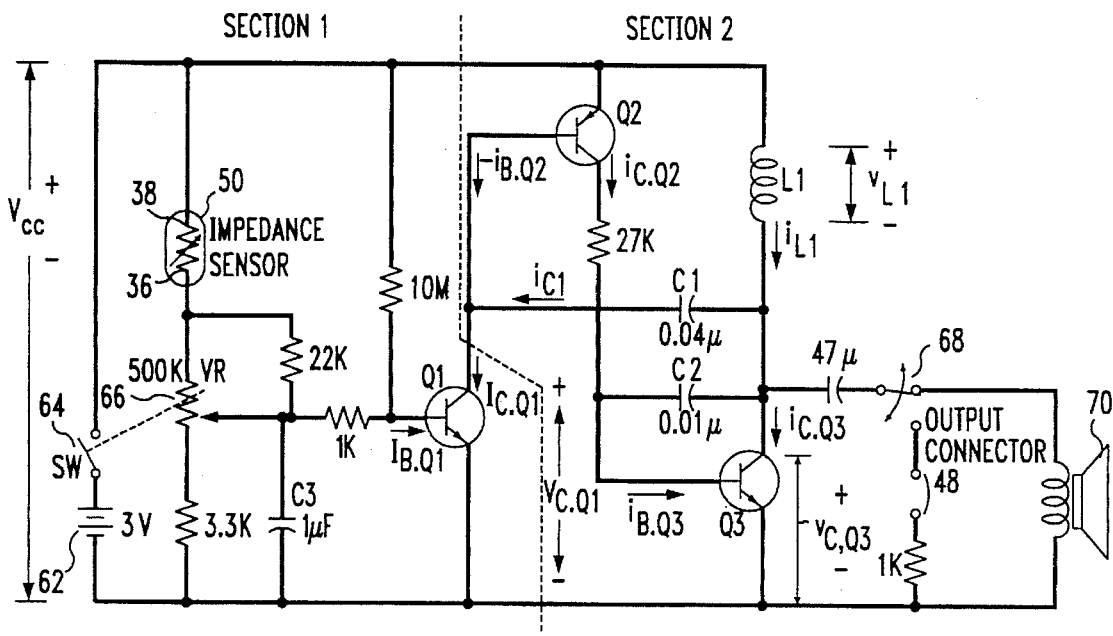
FIG. 4 illustrates a circuit within the bio-monitor.

Bio-monitor 30 contains the circuit of FIG. 4 which produces the bio-signal that indicates the impedance between points 38 and 36. The circuit consists of two sections. The first section is used to sense the impedance between contacts 38 and 36, and the second section acts as an oscillator to produce a series of ramp signals at output connector 48, where the frequency of oscillation is controlled by the first section.

The first section controls the collector current $I_{c,Q1}$ and voltage $V_{c,Q1}$ of transistor Q1 based on the impedance between contacts 38 and 36. In this embodiment, impedance sensor 50 is simply contacts 38 and 36 positioned on the speaker's skin. Since the impedance between contacts 38 and 36 changes relatively slowly in comparison to the oscillation frequency of section 2, the collector current $I_{c,Q1}$ and voltage $V_{c,Q1}$ are virtually constant as far as section 2 is concerned. The capacitor C3 further stabilizes these currents and voltages.

Section 2 acts as an oscillator. The reactive components, L1 and C1, turn transistor Q3 on and off to produce an oscillation. When the power is first turned on, $I_{c,Q1}$ turns on Q2 by drawing base current $I_{b,Q2}$. Similarly, $I_{c,Q2}$ turns on transistor Q3 by providing base current $I_{b,Q3}$. Initially there is no current through inductor L1. When Q3 is turned on, the voltage Vcc less a small saturated transistor voltage $V_{ce,Q3}$, is applied across L1. As a result, the current $I_{L1}$ increases in accordance with $$L \frac{dI_{L1}}{dt} = V_{L1}.$$

As current $I_{L1}$ increases, current $I_{c1}$ through capacitor C1 increases. Increasing the current $I_{c1}$ reduces the base current $I_{B,Q2}$ from transistor Q2 because current $I_{c,Q1}$ is virtually constant. This in turn reduces currents $I_{c,Q2}$, $I_{b,Q3}$ and $I_{c,Q3}$. As a result, more of current $I_{L1}$ passes through capacitor C1 and further reduces current $I_{c,Q3}$. This feedback causes transistor Q3 to be turned off. Eventually, capacitor C1 is fully charged and currents $I_{L1}$ and $I_{c1}$ drop to zero, and thereby permit current $I_{c,Q1}$ to once again draw base current $I_{b,Q2}$ and turn on transistors Q2 and Q3 which restarts the oscillation cycle.

Current $I_{c,Q1}$, which depends on the impedance between contacts 38 and 36, controls the frequency on duty cycle of the output signal. As the impedance between points 38 and 36 decreases, the time T between ramp signals decreases, and as the impedance between points 38 and 36 increases, the time T between ramp signals increases.

The circuit is powered by three-volt battery source 62 which is connected to the circuit via switch 64. Also included is variable resistor 66 which is used to set an operating point for the circuit. It is desirable to set variable resistor 66 at a position that is approximately in the middle of its range of adjustability. The circuit then varies from this operating point as described earlier based on the impedance between points 38 and 36. The circuit also includes switch 68 and speaker 70. When a mating connector is not inserted into connector 48, switch 68 provides the circuit's output to speaker 70 rather than connector 48.

Figure 5:
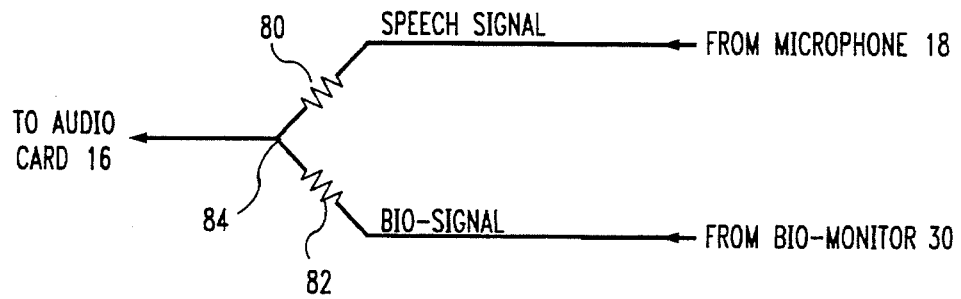
FIG. 5 illustrates a summing circuit.

FIG. 5 illustrates a summing circuit used by summer 32. The speech signal from microphone 18 is passed through a resistor 80, and the bio-signal from bio-monitor 30 is passed through resistor 82 to a summing point 84. The signal at summing point 84 is provided to audio card 17. Resistors 80 and 82 can have equal values or they can have different values so that the relative strength of the speech signal and bio-signal can differ. For example, resistors 80 and 82 can have a value such as 100Ω.

It is also possible to implement summer 32 by receiving the speech signal and the bio-signal with A/D (analog-to-digital) converters and then adding the two digital signals in a digital summing device. The output of the digital summing device can be passed to audio card 17 as a digital value if the audio card can accept a digital input, and if audio card 17 can not accept a digital input, the output of the summing device can be converted to an analog value using a digital-to-analog converter.

Figure 6:
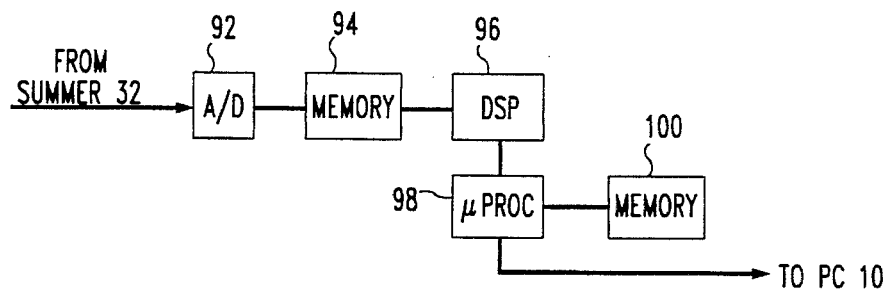
FIG. 6 is a block diagram of audio card 17.

FIG. 6 is a block diagram of audio card 17. The signal from summer 32 is received by A/D 90 which converts the signal into a digital signal and passes the digital signal to buffer memory 94. Buffer memory 94 stores the digital signal for use by DSP (Digital Signal Processor) 96. DSP 96 performs functions such as executing a series of FFTs (Fast Fourier Transform) on the signal stored in memory 94. The FFTs are performed sequentially in time and produce a series of groups of frequency components that compose the signal from summer 32. Microprocessor 98 controls DSP 96 and uses the results of the FFTs performed by DSP 96 to identify user 34's utterance. Microprocessor 98 identifies the utterance by comparing the series of groups of frequency components provided by DSP 96 with templates stored in memory 100. When an utterance is identified, microprocessor 98 passes the identity of the utterance to PC 10 using PC 10's internal communication bus so that PC 10 may take an action based on the utterance. Microprocessor 98 can be one of the widely available microprocessors available from Intel Corporation, and DSP 96 can be one of the widely available digital signal processing chips such as Texas Instruments' TMS320CXX series of devices. The software that uses the identities provided by microprocessor 98 to control PC 10 may be software such as a software package sold under the trade name (IN$^3$ VOICE COMMAND) by Command Corp. Inc. or a software package sold under the trade name (WINDOWS SOUND SYSTEM) sold by Microsoft Corporation. The software sold under the trade name (IN$^3$ VOICE COMMAND) or similar software may be run on PC 10 in a multi-application environment using a software package such as a program sold under the trade name (WINDOWS) by Microsoft Corporation.

Each template stored in memory 100 corresponds to an utterance to be recognized. The templates are created in a training mode during which user 34 provides samples of an utterance to be recognized by speaking into microphone 18 while bio-monitor 30 is attached to user 34. During training, DSP 96 performs a series of FFTs on the signal from summer 32. The FFTs are sequential in time and thereby produce a series of groups of frequency components that compose the utterance. The groups of frequency components are used to create a template. The template includes a sequence of several groups of frequency components, where the frequency components are specified by their position in the sequence, their relative magnitudes and their positions relative to a reference frequency derived from the bio-signal. The reference frequency used for creating the template is the bio-signal frequency component that is being used to monitor the user's emotional state, or the frequency derived from a bio-signal characteristic that is being used to monitor the user's emotional state. The frequency components from the bio-signal may be sampled during the silent periods between utterances to facilitate determining which frequency components in the signal from summer 32 result from the utterance, and which frequency components result from the bio-signal.

The bio-signal and the speech signal are summed in summer 32 and passed to audio card 17 which performs a speech recognition process. It is also possible to carry out parts of the speech recognition process, or the entire recognition process elsewhere within PC 10. If, for example, the FFT and comparison operations are carried out by PC 10, audio card 17 may simply act as an interface card between summer 32 and PC 10, and perform functions such as analog-to-digital conversion and signal storage.

Figure 7:
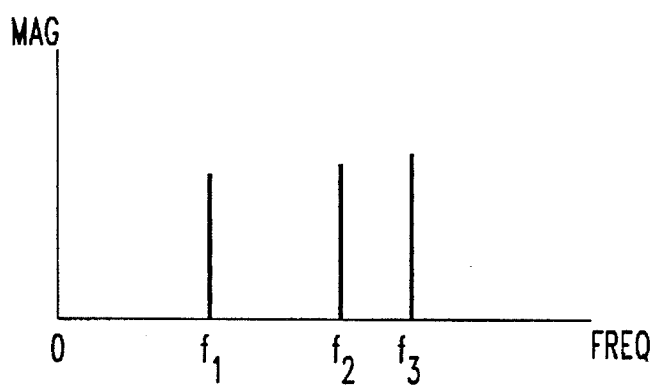
FIGS. 7 through 9 illustrate the frequency components of an utterance.

FIG. 7 illustrates one group of frequency components out of a series of groups of frequency components that compose an utterance or speech signal. It should be noted that for illustrative simplicity, only one group of frequency components is shown. The utterance may be recognized by comparing the characteristics of the frequency components contained in a set of templates created during training to the characteristics of a series of groups of frequency components composing the utterance or speech signal. Characteristics such as a frequency component's position in a series, the relative magnitudes of the frequency components, and their positions relative to zero frequency are compared. Unfortunately, as the user's emotional state changes, the frequency components of the utterance may move upward or downward in frequency as the user becomes more excited or more fatigued, respectively. As a result, the position of the frequency components relative to zero frequency changes by a large amount and reduces the recognition rate.

Figure 8:
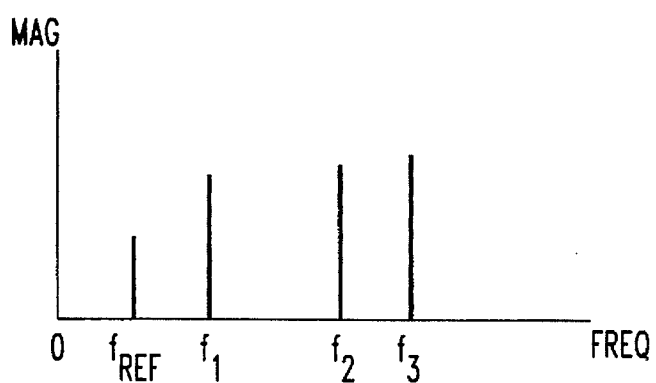

FIG. 8 illustrates reference frequency $f_{ref}$ and one group of frequency components out of a series of groups of frequency components that compose an utterance or speech signal. In this embodiment of the invention, an utterance is recognized by comparing the characteristics of the frequency components contained in the set of templates created during training to the characteristics of a series of groups of frequency components composing the utterance or speech signal. Characteristics such as a frequency component's position in a series, the relative magnitudes of the frequency components and the positions of those components relative to frequency $f_{ref}$ are compared. Reference $f_{ref}$ is obtained when an FFT is performed on the sum of the speech signal and the bio-signal, or on the bio-signal alone. It is also possible to determine $f_{ref}$ by performing an FFT on the signal from summer 32 during the silent periods between utterances; this facilitates distinguishing which frequency components in the signal from summer 32 result from the utterance and which frequency components result from the bio-signal.

Reference $f_{ref}$ is derived from the bio-signal, and as a result, moves upward or downward in frequency according to the user's emotional state. In reference to the bio-signal of FIG. 3, the time T between ramps 42 of the bio-signal vary with the user's emotional state, therefore an FFT of the bio-signal, or an FFT of the sum of the bio-signal and speech signal may be used to determine a reference frequency $f_{ref}$ that changes with the user's emotional state.

Figure 9:
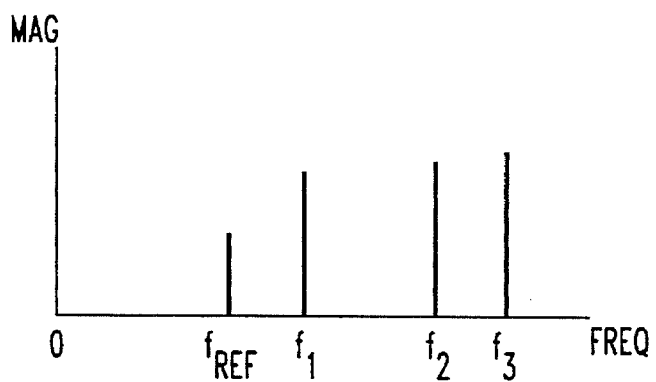

FIG. 9 illustrates a situation where the user has become more excited and reference point $f_{ref}$ has moved to the right on the frequency axis. It should be noted that frequency components f1, f2 and f3 have also moved to the right. As a result, the positions of frequency components f1, f2 and f3 relative to point $f_{ref}$ have changed less than their positions relative to zero frequency. Since the recognition process is carried using the position of frequency components f1, f2 and f3 relative to reference $f_{ref}$, the change in the user's level of excitement, and the corresponding change in the frequency components of the utterance, have less effect on the recognition rate.

The relationship between the bio-signal and the frequency components of an utterance may not be the same from use-to-use, therefore it may be desirable to calibrate the recognition system. If a calibration is not performed, $f_{ref}$ may be set equal to $f_b$, where $f_b$ is the bio-signal frequency component that is being used to monitor the user's emotional state, or the frequency derived from a bio-signal characteristic that is being used to monitor the user's emotional state. A change in the relationship between frequency $f_b$ and the frequency components of the speech signal may be compensated for by determining a value A that is used in accordance with Equation 1.

$$f_{ref} = f_b + \Delta \qquad (1)$$

Figure 10:
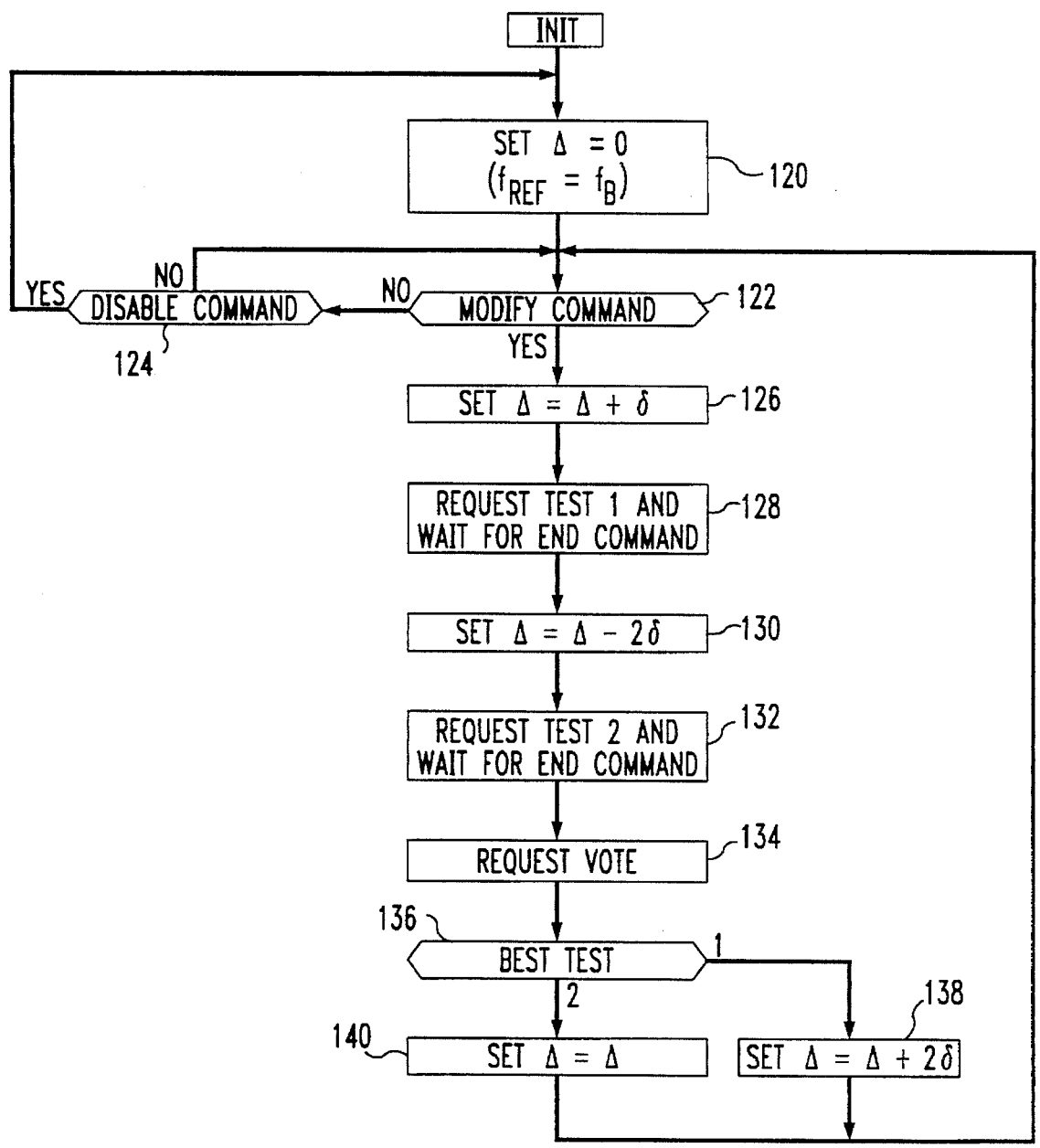
FIG. 10 is a flow chart of a calibration program.

FIG. 10 illustrates a program carried out by PC 10 or a processor within audio card 17 to perform the calibration process. After initialization, the calibration process is started in step 120 where the value of $\Delta$ is set equal to zero so that reference frequency $f_{ref}$ is equal to frequency $f_b$. In step 122, it is determined whether a modify command was received. If a modify command was not received, step 124 is executed to determine if a disable command was received. If a disable command was not received, step 122 is executed. If a disable command was received, $f_{ref}$ is set equal to $f_b$ by executing step 120 which sets $\Delta$ equal to zero. If a modify command is received in step 122, step 126 is executed. In this step, the value of $\Delta$ is set equal to the present value of $\Delta$ plus $\delta$. The variable $\delta$ may have a value such as 10. In step 128 the user is requested to perform a recognition test and to enter an "end" command when completed. The recognition test may comprise the user speaking several commands into microphone 18 to determine if an acceptable recognition rate has been achieved. In step 130, $\Delta$ is set equal to the present value of $\Delta$ minus two times $\delta$. In step 132, the user is once again requested to perform a recognition test and to press an "end" command when the test is completed. In step 134, the user is requested to identify the test that had the most desirable results. In decision step 136 a decision is made to execute step 138 if test 1 is voted best, and a decision is made to execute step 140 if test 2 is voted best. In step 138, $\Delta$ is set equal to the present value of $\Delta$ plus two times $\delta$, and in step 140, the present value of $\Delta$ is kept as the new value of $\Delta$. After executing steps 140 or 138, steps 122 and 124 are executed where a looping operation is used to detect a modify or disable command.

Once the proper value of $\Delta$ is established, the frequency components of the speech signal are analyzed with respect to reference frequency $f_{ref}$ where $f_{ref}$ is equal to the sum of $\Delta$ and frequency $f_b$ derived from the bio-signal.

PC 10 or another processor, such as a processor on audio card 17 may execute the calibration program. If PC 10 executes the calibration program, PC 10 can communicate with a digital signal processor performing the FFTs and/or the processor performing the speech recognition using the internal bus of the PC. Software required to run the calibration program can be an application that is run on PC 10 while PC 10 is using a multi-application program such as a program sold under the trade name (WINDOWS) by Microsoft Corporation. The user may communicate with the calibration program through display 12 and keyboard 14.

It is also possible to provide the speech signal and the bio-signal to audio card 17 separately. In this embodiment, an FFT may be performed on the sum of the bio-signal and the speech signal, or an FFT may be performed on each of the signals separately. If the FFTs are performed separately, the FFT of the bio-signal is used to determine $f_{ref}$.

What is claimed:

1. A method for using a speech recognition system to recognize a user's utterance, comprising the steps of:
   converting the utterance into a signal;
   adding a bio-signal derived from the user with said signal to produce a modified signal; and
   providing said modified signal to the speech recognition system.

2. The method of claim 1, further comprising the steps of using a frequency derived from said bio-signal to form a reference, and using a position of a frequency component of said signal, with respect to said reference, to recognize said utterance.

3. The method of claim 2, wherein said frequency derived from said bio-signal is related to the periodicity of said bio-signal.

4. The method of claim 1, wherein said bio-signal is related to autonomic activity.

5. The method of claim 1, wherein said bio-signal is related to the user's emotional state.

6. The method of claim 1, wherein said bio-signal is related to impedance.

7. The method of claim 1, wherein said bio-signal is related to pulse.

8. The method of claim 1, wherein said bio-signal is related to blood pressure.

9. The method of claim 1, wherein said bio-signal is related to electrical activity.

10. The method of claim 1, wherein said bio-signal is related to pupil size.

11. The method of claim 1, wherein said bio-signal is related to temperature.

12. The method of claim 1, wherein said bio-signal is related to skin transparency.

13. The method of claim 1, wherein said bio-signal is related to reflectivity.

* * * * *